(12) United States Patent
Que et al.

(10) Patent No.: US 12,069,360 B2
(45) Date of Patent: Aug. 20, 2024

(54) ELECTRONIC DEVICE

(71) Applicant: VIVO MOBILE COMMUNICATION CO., LTD., Dongguan (CN)

(72) Inventors: Haibo Que, Dongguan (CN); Huasheng Zhu, Dongguan (CN); Kecheng Zhang, Dongguan (CN); Kai Huang, Dongguan (CN); Hongchao Zhao, Dongguan (CN); Fei Cao, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 126 days.

(21) Appl. No.: 17/746,909

(22) Filed: May 17, 2022

(65) Prior Publication Data

US 2022/0279100 A1 Sep. 1, 2022

Related U.S. Application Data

(63) Continuation of application No. PCT/CN2020/128017, filed on Nov. 11, 2020.

(30) Foreign Application Priority Data

Nov. 18, 2019 (CN) .......................... 201911130028.6

(51) Int. Cl.
*H04N 23/55* (2023.01)
*G02B 5/30* (2006.01)
*H04N 23/63* (2023.01)

(52) U.S. Cl.
CPC ........... *H04N 23/55* (2023.01); *G02B 5/3033* (2013.01); *H04N 23/63* (2023.01)

(58) Field of Classification Search
CPC ........ H04N 23/55; H04N 23/63; H04N 23/50; H04N 23/54; H04N 23/57; G02B 5/3033; H04M 1/0264
See application file for complete search history.

(56) References Cited

U.S. PATENT DOCUMENTS

2006/0158597 A1 7/2006 Ito et al.
2008/0165439 A1 7/2008 Chang
(Continued)

FOREIGN PATENT DOCUMENTS

CN 108957829 A 12/2018
CN 108989508 A 12/2018
(Continued)

OTHER PUBLICATIONS

Extended European Search Report issued in related European Application No. 20890265.0, mailed Dec. 16, 2022, 8 pages.
(Continued)

*Primary Examiner* — Jason A Flohre
(74) *Attorney, Agent, or Firm* — IPX PLLC

(57) ABSTRACT

Disclosed is an electronic device including a display module and a camera module. The display module includes a first substrate and a second substrate stacked with each other, a wiring structure having a light passing hole, and a polarizer disposed on a side surface of the first substrate and being away from the second substrate. The camera module includes a camera body provided with a light entering hole and a light shielding layer provided with a second light passing hole. The first light passing hole, the second light passing hole, and the light entering hole are arranged on an optical axis direction of the camera module. Orthographic projections of both the first and second light passing holes on a plane perpendicular to the optical axis direction are located within an orthographic projection of the light entering hole on the plane perpendicular to the optical axis direction.

7 Claims, 1 Drawing Sheet

(56) References Cited

U.S. PATENT DOCUMENTS

| | | | |
|---|---|---|---|
| 2018/0276444 A1 | 9/2018 | Sun et al. | |
| 2020/0186688 A1* | 6/2020 | Chen | H04N 23/54 |
| 2021/0018793 A1* | 1/2021 | Zhang | G02F 1/133512 |
| 2021/0074780 A1* | 3/2021 | Woo | H10K 59/65 |
| 2021/0109398 A1* | 4/2021 | Son | G02F 1/13312 |
| 2022/0026771 A1* | 1/2022 | Yan | G02F 1/133528 |
| 2022/0163854 A1* | 5/2022 | Mochizuki | G03B 11/045 |

FOREIGN PATENT DOCUMENTS

| | | |
|---|---|---|
| CN | 109148550 A | 1/2019 |
| CN | 109240020 A | 1/2019 |
| CN | 109541833 A | 3/2019 |
| CN | 109597236 A | 4/2019 |
| CN | 110062082 A | 7/2019 |
| CN | 110300246 A | 10/2019 |
| CN | 209460528 U | 10/2019 |
| CN | 110426878 A | 11/2019 |
| CN | 110784635 A | 2/2020 |

OTHER PUBLICATIONS

International Search Report issued in corresponding International Application No. PCT/CN2020/128017, mailed Feb. 10, 2021, 5 pages.

First Office Action issued in related Chinese Application No. 201911130028.6, mailed Nov. 26, 2020, 7 pages.

* cited by examiner

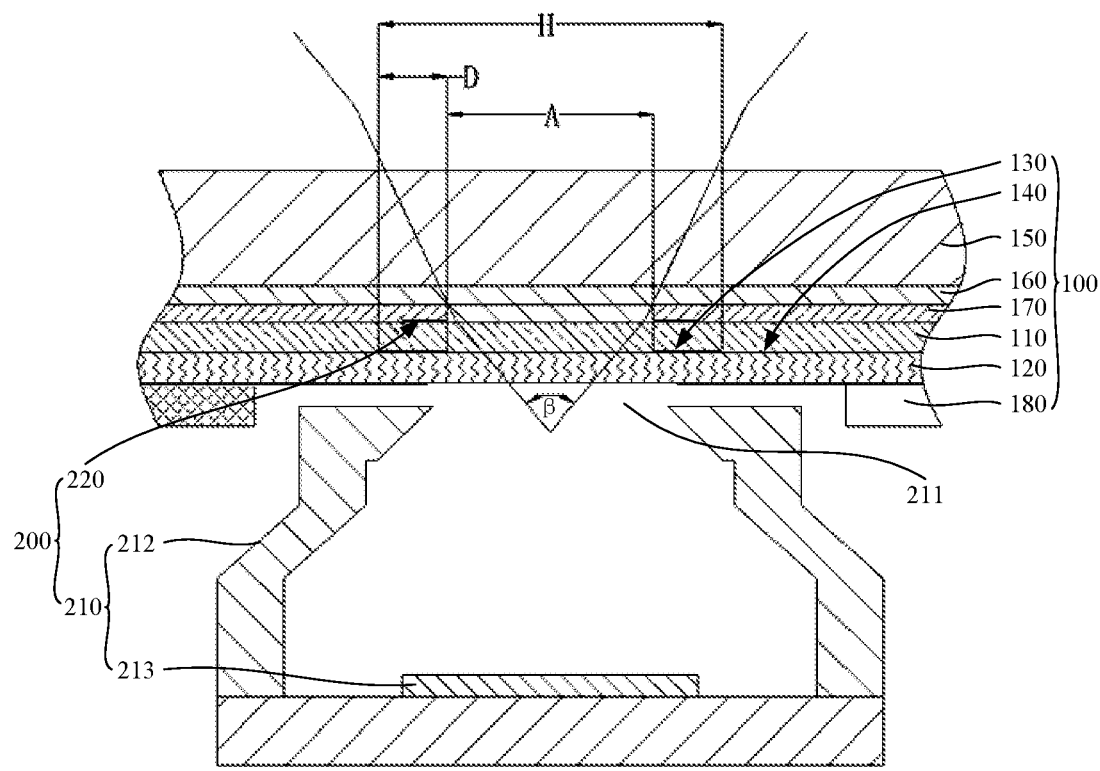

ELECTRONIC DEVICE

CROSS-REFERENCE TO RELATED APPLICATIONS

This application is a continuation of International Application No. PCT/CN2020/128017, filed Nov. 11, 2020, which claims priority to Chinese Patent Application No. 201911130028.6, filed Nov. 18, 2019. The entire contents of each of the above-referenced applications are expressly incorporated herein by reference.

TECHNICAL FIELD

The present disclosure relates to the field of communications technologies, and in particular to an electronic device.

BACKGROUND

Electronic devices such as smartphones and tablets have become indispensable in people's daily life. The screen-to-body ratio of an electronic devices is one of the important factors that have an impact on user experience. Therefore, those skilled in the art have paid great attention to increase the screen-to-body ratio of the electronic devices in design.

To increase the screen-to-body ratio of the electronic devices in the related art, a camera module may be disposed below the display module, and the display module is provided with a light passing hole to ensure that the camera module can work normally. The camera module mainly includes devices such as a bracket, a lens assembly, a light shielding layer. The lens assembly is installed in the bracket, the light shielding layer is installed on the bracket, and the light shielding layer is located above the lens assembly.

Because a certain distance exists between the light shielding layer and the display module, the light passing hole provided on the display module needs to be greater than an inner diameter of the light shielding layer. In addition, there is an assembly error between the display module and the camera module. Therefore, when a hole is provided on the display module, the assembly error needs to be considered and then a size of the light passing hole needs to be enlarged. Therefore, the display module in the related art has a relatively large light passing hole, which leads to a small screen-to-body ratio of the electronic devices.

SUMMARY

The present disclosure provides an electronic device, including:

a display module, including a first substrate, a second substrate, a wiring structure, and a polarizer, where the first substrate and the second substrate are stacked, the wiring structure is disposed on a side surface, facing the first substrate, of the second substrate, the wiring structure is provided with a light passing hole, and the polarizer is disposed on a side surface, away from the second substrate, of the first substrate; and a camera module, including a camera body and a light shielding layer, where the camera body is provided with a light entering hole, the second substrate is located between the first substrate and the camera body, the light shielding layer is disposed on a surface, facing the first substrate, of the polarizer, and the light shielding layer is provided with a second light passing hole;

where the first light passing hole, the second light passing hole, and the light entering hole are arranged in an optical axis direction of the camera module, and an orthographic projection of the first light passing hole on a plane perpendicular to the optical axis direction and an orthographic projection of the second light passing hole on the plane perpendicular to the optical axis direction are both located within an orthographic projection of the light entering hole on the plane perpendicular to the optical axis direction.

The technical solutions used in the present disclosure can achieve the following beneficial effects.

In the electronic device provided according to the present disclosure, the light shielding layer of the camera module is disposed on a surface, facing the first substrate, of the polarizer. Through such design, a distance between the light shielding layer and the display module is almost zero, and the first light passing hole may be smaller. In addition, there is no assembly error between the display module and the light shielding layer, and therefore, the first light passing hole may be disposed regardless of the assembly error, and a size of the first light passing hole may be further reduced, so that a screen-to-body ratio of the electronic device may be higher.

BRIEF DESCRIPTION OF DRAWINGS

The accompanying drawings described herein are used to provide further understanding of the present disclosure and constitute a part of the present disclosure. The illustrative embodiments of the present disclosure and descriptions thereof are used to explain the present disclosure, and do not constitute an improper limitation to the present disclosure. In the accompanying drawings:

FIG. 1 is a sectional view of a partial structure of an electronic device according to an embodiment of the present disclosure.

DETAILED DESCRIPTION

To make the objectives, technical solutions, and advantages of the present disclosure clearer, the following clearly describes the technical solutions of the present disclosure with reference to specific embodiments of the present disclosure and the accompanying drawings. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The following describes in detail the technical solutions disclosed in the embodiments of the present disclosure with reference to the accompanying drawings.

As shown in FIG. 1, an embodiment of the present disclosure discloses an electronic device, which may specifically include a display module 100 and a camera module 200.

The display module 100 may specifically include a first substrate 110, a second substrate 120, and a wiring structure 130. The first substrate 110 and the second substrate 120 are stacked. The wiring structure 130 is disposed on a side surface, facing the first substrate 110, of the second substrate 120. Both the first substrate 110 and the second substrate 120 may be glass plates, and a thin film transistor may be disposed on the second substrate 120. The wiring structure 130 may be a annular structure, and the wiring structure 130 is provided with a first light passing hole through which light can pass, so that light from an external environment can enter the camera module 200. The display module 100 may further include a light emitting portion 140, a light transmitting cover plate 150, an optical adhesive 160, a polarizer 170, and foam 180. The light emitting portion 140 may be disposed between the first substrate 110 and the second substrate 120, and the light emitting portion 140 may be an organic light emitting layer. The polarizer 170 may be disposed on a side surface, away from the second substrate 120, of the first substrate 110. The light transmitting cover plate 150 is located on a side, away from the second substrate 120, of the first substrate 110, and the light transmitting cover plate 150 may be connected to the polarizer 170 through the optical adhesive 160. The foam 180 may be disposed on a side, away from the first substrate 110, of the second substrate 120. The foam 180 may be bonded with the second substrate 120, and an avoidance hole may be disposed on the foam. At least a part of the camera module 200 may be located in the avoidance hole, so that it can be prevented that stray light in the display module 100 affects normal operation of the camera module 200, and space occupied by the camera module 200 can be reduced. Therefore, thickness of the electronic device can be reduced.

The camera module 200 may specifically include a camera body 210 and a light shielding layer 220. The camera body 210 is provided with a light entering hole 211. The second substrate 120 is located between the first substrate 110 and the camera body 210. The light shielding layer 220 is disposed on a surface, facing the first substrate 110, of the polarizer 170, and the light shielding layer 220 is provided with a second light passing hole. The camera body 210 may specifically include a bracket 212, a lens assembly, and a photosensitive chip 213. The lens assembly is disposed on the bracket 212, and the lens assembly may include lenses such as a convex lens and a concave lens, so as to achieve effects such as light convergence. The photosensitive chip 213 may be disposed in the bracket 212. The photosensitive chip 213 has a photosensitive region for light sensing, and the photosensitive chip 213 can convert a light signal into an electrical signal to obtain corresponding image information. The second light passing hole can also allow light to pass through, so that light from the external environment can enter the camera module 200 and reach the photosensitive region of the photosensitive chip 213, so that a shooting function can be implemented.

Both the wiring structure 130 and the light shielding layer 220 can shield light. The first light passing hole, the second light passing hole, and the light entering hole 211 are arranged in an optical axis direction of the camera module 200. Therefore, the light in the external environment can pass through the second light passing hole and the first light passing hole in turn, and finally enter the camera module 200 through the light entering hole 211, so that the camera module 200 can implement the shooting function. An orthographic projection of the first light passing hole on a plane perpendicular to the optical axis direction of the camera module 200 and an orthographic projection of the second light passing hole on the plane perpendicular to the optical axis direction are both located within an orthographic projection of the light entering hole 211 on the plane perpendicular to the optical axis direction. That is to say, when viewed in the optical axis direction of the camera module 200, an outline size of the first light passing hole and an outline size of the second light passing hole are both smaller than an outline size of the light entering hole 211. A size of the light entering hole 211 is set to be slightly large, so that a screen-to-body ratio of the display module 100 is not affected, and it can be ensured that the light in the external environment can enter the camera module 200 as much as possible. The first light passing hole and the second light passing hole will affect the screen-to-body ratio of the display module 100. Therefore, on the premise of meeting shooting requirements of the camera module 200, the first light passing hole and the second light passing hole can be set as small as possible, so that an occupancy ratio of the wiring structure 130 and the light shielding layer 220 to the display area can be reduced, and the screen-to-body ratio of the electronic device can be increased.

In the electronic device, the light shielding layer 220 of the camera module 200 is disposed on the display module 100. This way, a distance between the light shielding layer 220 and the display module 100 is almost zero, so the first light passing hole may be smaller. In addition, there is no assembly error between the display module 100 and the light shielding layer 220. Therefore, the first light passing hole is disposed regardless of the assembly error, and a size of the first light passing hole may be further reduced, so that the screen-to-body ratio of the electronic device may be larger. What's more, after the size of the first light passing hole is reduced, appearance and quality of the electronic device can be improved, and user experience can be improved accordingly.

In an embodiment, the polarizer 170 is provided with a third light passing hole through which light can pass, so that light transmittance of an area corresponding to the camera module 200 can be improved, and shooting quality of the camera module 200 can be improved accordingly. An orthogonal projection of the third light passing hole on a plane perpendicular to the optical axis direction coincides with an orthogonal projection of the second light passing hole on the plane perpendicular to the optical axis direction. In this case, a part of the optical adhesive 160 can extend into the third light passing hole and the second light passing hole, so as to fill the third light passing hole and the second light passing hole. Therefore, the part of the optical adhesive 160 can contact a side surface, away from the second substrate 120, of the first substrate 110, so as to be connected to the first substrate 110. Therefore, structural strength of the display module 100 can be better. More importantly, during processing of the display module 100, positions of the light shielding layer 220 and the polarizer 170 may be mutually referenced, which helps to rapidly shape the display module 100, so that shaping efficiency of the display module can be improved. In addition, an edge formed by the polarizer 170 provided with the third light passing hole is aligned with an edge formed by the light shielding layer 220 provided with the second light passing hole, so that shaping quality of the light shielding layer 220 can be ensured, and the light shielding layer 220 can be as close to a center line of the third light passing hole as possible, and so the size of the light shielding layer 220 can be reduced. Therefore, costs for the light shielding layer 220 can be reduced, and it can be prevented that a part of the display module 100 that cannot be used for display is increased due to an oversized light shielding layer 220, which helps to increase the screen-to-body ratio of the electronic device.

As described above, the first light passing hole and the second light passing hole will affect the screen-to-body ratio of the display module 100. Therefore, the first light passing and the second light passing hole can be set as small as possible. In an embodiment, an orthogonal projection of the first light passing hole on a plane perpendicular to an optical axis direction of the camera module 200 may coincide with an orthogonal projection of the second light passing hole on the plane perpendicular to the optical axis direction. In other words, a shape and a size of the first light passing hole are the same as a shape and a size of the second light passing hole. Therefore, sizes of the first light passing hole and the second light passing hole can be set as small as possible, and relative positions of the two holes can be referred to each other during shaping of the display module 100, which helps to process the display module 100.

In this embodiment of the present disclosure, outer contour shapes of the wiring structure 130 and the light shielding layer 220 can be flexibly set, for example, the outer contour shapes may be rectangular, circular, or oval. In addition, shapes of the first light passing hole and the second light passing hole may also be flexibly selected, for example, rectangular holes, circular holes, oval holes, or the like. In an embodiment, in view of that a shape of a field of view of the camera module 200 is usually circular, to be adapted to the camera module 200 and further increase the screen-to-body ratio of the electronic device, both the wiring structure 130 and the light shielding layer 220 may be set to annular structures. In this case, a radial width of the light shielding layer 220 may be smaller than a radial width of the wiring structure 130, which can prevent an excessively large light shielding area due to an excessively large radial width of the light shielding layer 220, and further achieve the foregoing purpose.

Referring to FIG. 1, $H=A+D*2$, where H is a size of a hole that cannot be displayed on an appearance surface of the display module 100, A is an aperture of the second light passing hole (or an aperture of the first light passing hole), and D is a width of the wiring structure 130. Because a field angle β of the camera module 200 is a fixed value, A is basically a fixed value, and D is also basically a fixed value. In this case, a size of H is not affected by factors such as an assembly error, and so H may set to be smaller.

To improve a shooting effect of the camera module 200, a distance between a focus of the camera body 210 and the light shielding layer 220 in the optical axis direction may be set to a preset value. That is to say, when a position of the light shielding layer 220 is changed, a position of the camera body 210 changes accordingly, so as to ensure that a position of the focus of the camera body 210 and the position of the light shielding layer 220 keep matching each other, so that a shooting effect can be improved. In this embodiment of the present disclosure, because the light shielding layer 220 is moved up to the display module 100, a distance between the camera body 210 and the display module 100 can be further reduced, so that the display module 100 and the camera module 200 can distributed more compactly, which helps to stack components and parts in the electronic device.

There are multiple implementation solutions for shaping the light shielding layer 220. In an embodiment, the light shielding layer 220 may be shaped by using a coating process. That is to say, the light shielding layer 220 may be a coating structure, and such coating structure helps the shaping, and thickness of the shaped light shielding layer 220 is small, which helps to better control thickness of the electronic device.

Definitely, the light shielding layer 220 may also be a printed structure. That is, the light shielding layer 220 may be shaped on a side, facing the first substrate 110, of the polarizer 170 through a printing process, which has advantages of easy implementation and small thickness of the shaped light shielding layer 220.

During assembly of the electronic device, alignment fixation between the light shielding layer 220 and the camera body 210 can be implemented by means of accurate positioning of a Charge-coupled Device (CCD) camera, dynamic alignment adjustment of the camera module 200 driven by a micro motor, or the like. Therefore, relative positions of the light shielding layer 220 and the camera body 210 can be more accurate, which can not only ensure an imaging effect of the camera module 200, but also increase the size of the first light passing hole regardless of an alignment error, so that the screen-to-body ratio of the electronic device can be improved.

The electronic device disclosed in the embodiments of the present disclosure may be a smartphone, a tablet computer, an e-book reader, or a wearable device. Definitely, the electronic device may also be another device, which is not limited in the embodiments of the present disclosure.

The foregoing embodiments of the present disclosure focus on differences between various embodiments. Different optimization features of the various embodiments can be combined to form a better embodiment as long as they are not contradictory. Considering conciseness of description, details are not described herein.

The foregoing descriptions are merely embodiments of the present disclosure, but are not intended to limit the present disclosure. For a person of ordinary skill in the art, the present disclosure may have various changes and variations. Any modification, equivalent replacement, improvement, or the like made without departing from the spirit and principle of the present disclosure shall fall within the scope of claims of the present disclosure.

What is claimed is:

1. An electronic device, comprising:
   a display module comprising a first substrate, a second substrate, a wiring structure, and a polarizer, wherein the first substrate and the second substrate are stacked, the wiring structure is disposed on a side surface, facing the first substrate, of the second substrate, the wiring structure is provided with a first light passing hole, and the polarizer is disposed on a side surface, away from the second substrate, of the first substrate; and
   a camera module comprising a camera body and a light shielding layer, wherein the camera body is provided with a light entering hole, the second substrate is located between the first substrate and the camera body, the light shielding layer is disposed on a surface, facing the first substrate, of the polarizer, and sandwiched between the first substrate and the polarizer, and the light shielding layer is provided with a second light passing hole;
   wherein the first light passing hole, the second light passing hole, and the light entering hole are arranged in an optical axis direction of the camera module, and an orthographic projection of the first light passing hole on a plane perpendicular to the optical axis direction and an orthographic projection of the second light passing hole on the plane perpendicular to the optical axis direction are both located within an orthographic projection of the light entering hole on the plane perpendicular to the optical axis direction.

2. The electronic device according to claim 1, wherein the polarizer is provided with a third light passing hole, and an orthogonal projection of the third light passing hole on the plane perpendicular to the optical axis direction coincides with the orthogonal projection of the second light passing hole on the plane perpendicular to the optical axis direction.

3. The electronic device according to claim 1, wherein the orthogonal projection of the first light passing hole on the plane perpendicular to the optical axis direction coincides with the orthogonal projection of the second light passing hole on the plane perpendicular to the optical axis direction.

4. The electronic device according to claim 3, wherein both the wiring structure and the light shielding layer are annular structures, and a radial width of the light shielding layer is smaller than that of the wiring structure.

5. The electronic device according to claim 1, wherein a distance between a focus of the camera body and the light shielding layer in the optical axis direction is a preset value.

6. The electronic device according to claim 1, wherein the light shielding layer is a coating structure.

7. The electronic device according to claim 1, wherein the light shielding layer is a printed structure.

\* \* \* \* \*